United States Patent [19]

Peters

[11] Patent Number: 5,176,031
[45] Date of Patent: Jan. 5, 1993

[54] VISCOUSLY COUPLED DUAL BEAM ACCELEROMETER

[75] Inventor: Rex B. Peters, Woodinville, Wash.

[73] Assignee: Sundstrand Corporation, Rockford, Ill.

[21] Appl. No.: 609,270

[22] Filed: Nov. 5, 1990

[51] Int. Cl.$^5$ .............................................. G01P 15/10
[52] U.S. Cl. ............................ 73/516 R; 73/517 AV; 73/517 R
[58] Field of Search ......... 73/516 R, 517 AV, 517 R, 73/497

[56] References Cited

U.S. PATENT DOCUMENTS 4,517,841 5/1985 Peters et al. .................. 73/517 AV
4,712,427 12/1987 Peters ............................ 73/517 AV Primary Examiner—John E. Chapman
Attorney, Agent, or Firm—Fitch, Even, Tabin & Flannery

[57] ABSTRACT

A viscously coupled dual beam accelerometer. An accelerometer (60) includes a first proof mass (32') and a second proof mass (42'), which are respectively connected by flexures (36' and 46') to a first base (34') and a second base (44'). The first and second bases are clamped between a top enclosure (62) and a bottom enclosure (64), between which is defined a cavity (66) in which the first and second proof masses are disposed. A quartz crystal resonator (38') extends between the first proof mass and the first base; similarly, a quartz crystal resonator (48') extends between the second proof mass and second base. The quartz crystal resonators experience tension/compression in a push-pull mode when the accelerometer is subjected to acceleration along an acceleration-sensitive axis (26') that extends transversely through the proof masses. A fluid within the cavity couples the first and second proof masses together through a "squeeze film damping," due to their closely-spaced relationship to each other. As a result of this dynamic mutual damping of out-of-phase motion of the first and second proof masses, tracking errors in the signals produced by the quartz crystal resonators are minimized when the accelerometer is subjected to vibration at a frequency close to the resonant frequency of the proof masses.

20 Claims, 3 Drawing Sheets

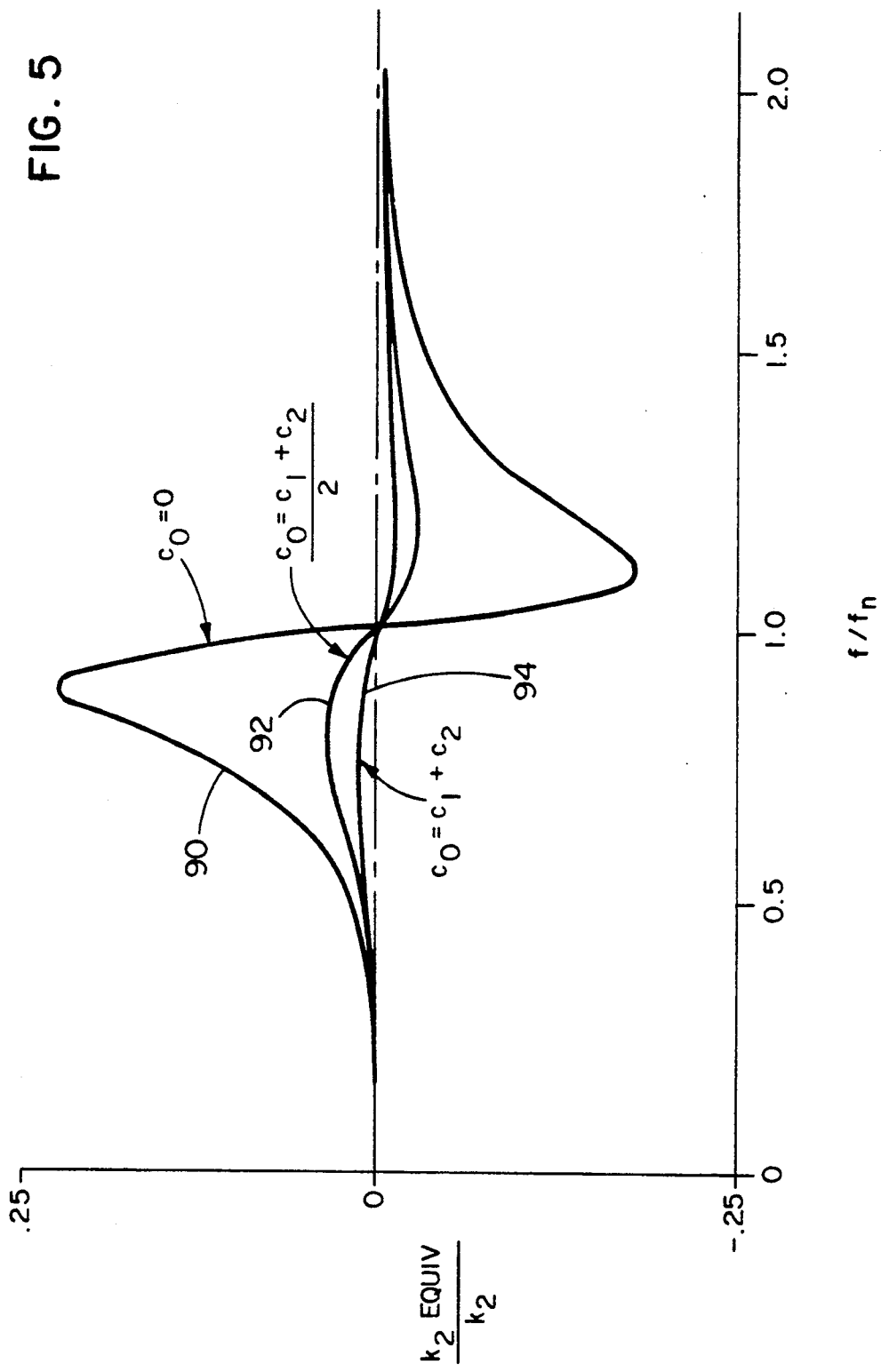

VISCOUSLY COUPLED DUAL BEAM ACCELEROMETER

TECHNICAL FIELD

This invention generally pertains to an accelerometer and, more specifically, to a dual vibrating beam accelerometer.

BACKGROUND OF THE INVENTION

A typical high-performance vibrating beam accelerometer (VBA) includes dual force-sensitive resonators operated in a push-pull mode to minimize the effects of common mode errors. Such devices have been constructed in basically two different configurations. In the first configuration, two pendulous proof masses are arranged generally parallel to each other in separate, closed cavities. Each proof mass is provided with a quartz crystal resonator to sense the force developed as a result of acceleration directed along a sensitive axis of the accelerometer, e.g., in a direction transverse to the parallel longitudinal axes of the two proof masses.

One benefit of this first configuration is minimization of potential interaction between the two proof masses so that thermal stresses are limited by the stiffness of the flexures and not by the stiffness of the force-sensitive resonators. The resonators in a VBA are inherently very stiff, giving a wide useful bandwidth, but pendulous geometry permits the flexures, which attach the proof mass to the supporting case, to be very soft. Both thermal stress in the resonator and the effects of stress in the accelerometer case can be minimized in this design. Furthermore, the design of this type of dual VBA is relatively straightforward and simple, yielding excellent static performance and long-term stability. However, there are also disadvantages to this configuration. Minor mismatches in damping and in natural resonant frequency between the two proof masses can cause dynamic errors to arise when the accelerometer is subjected to vibration at frequencies approaching the natural resonant frequency of the proof masses. Under such dynamic conditions, the two proof masses may fail to uniformly track the vibration, resulting in a significant undesirable impact on common mode rejection.

The other basic configuration for a VBA uses a single proof mass connected to two quartz crystal resonators. The single proof mass configuration, while appearing simpler than the dual VBA, actually requires much more design expertise and must be mechanically more elaborate to alleviate thermal stress errors that can result from the back-to-back mounting of two quartz crystal resonators to a single proof mass. Typically, the single proof mass configuration provides from five to ten times better dynamic tracking than the conventional dual VBA configuration—but at a price. To resist flexure buckling under transverse loading, the single proof mass generally must be mounted with a flexure that is relatively stiffer in translation than is desirable, causing it to be more sensitive to case stress. For this and other reasons, the single proof mass configuration for a VBA represents a compromise between dynamic performance, complexity, and cost.

Accordingly, it is an object of the present invention to improve the dynamic performance of a dual VBA by minimizing the effect on common mode tracking resulting from operation in an environment where the accelerometer is subjected to vibration close to the resonant frequency of its proof masses. It is a further object of this invention to viscously couple the dual proof masses of the accelerometer with a fluid that damps their non-synchronous vibration. These and other objects and advantages of the invention should be apparent from the attached drawings and the Description of the Preferred Embodiment that follows.

SUMMARY OF THE INVENTION

In accordance with the present invention, an accelerometer includes an enclosure having a first and a second damping plate disposed at generally opposite ends of the accelerometer. The enclosure defines a cavity between the first and the second damping plates. A first pendulous mass is integrally connected to a first fixed base by a first flexure and is pivotable about the first flexure in response to an acceleration. Similarly, a second pendulous mass is integrally connected to a second fixed base by a second flexure, about which it pivots in response to the acceleration. The second pendulous mass is generally in parallel alignment with and closely spaced apart from the first pendulous mass.

A first sensor is connected between the first fixed base and the first pendulous mass so as to sense rotational movement of the first pendulous mass due to the acceleration and to produce a first signal in response thereto. Likewise, a second sensor is connected between the second fixed base and the second pendulous mass so as to sense rotational movement of the second pendulous mass due to the acceleration and to produce a second signal in response thereto. A fluid is disposed within the cavity, between the first and the second pendulous masses. The first and second pendulous masses are mutually coupled, due to their proximity to each other, by the fluid interposed between them so that they track together when they are excited at their resonant frequency. As a result, an error in the first and the second signals is minimized.

The first and second pendulous masses have generally opposed planar surfaces that are spaced sufficiently close to each other so that each provides a squeeze film damping of the pivotal motion of the other to minimize a tracking error, the fluid between them thereby viscously coupling the first and second pendulous masses together. Also, the first damping plate defines a generally planar surface that is disposed opposite and closely proximate a generally planar surface of the first pendulous mass. Further, the second damping plate defines a generally planar surface that is disposed opposite and closely proximate a generally planar surface of the second pendulous mass. The fluid disposed between the closely proximate, generally planar surfaces of the first damping plate and the first pendulous mass, and between the generally planar surfaces of the second damping plate and the second pendulous mass provides a squeeze film damping of the pivotal motion of the first pendulous mass and the second pendulous mass, respectively. Preferably, the space between the first and second pendulous masses is the same or less than the sum of the space between the first pendulous mass and the first damping plate, and the space between the second pendulous mass and the second damping plate. The fluid preferably comprises a gas.

If the first and second pendulous masses are separated by a distance, S, the coupling force between them varies approximately as $1/S^3$. The first and second fixed bases are clamped between the first and second damping plates in the preferred form of the invention.

In an accelerometer having dual pendulous masses, a method for damping tracking error resonant oscillations by viscously coupling the dual pendulous masses is another aspect of the present invention. Each pendulous mass is connected to a sensor that produces a signal corresponding to an acceleration. The method includes the step of mounting the pendulous masses within a cavity so that they are closely spaced apart from each other. The cavity is filled with a fluid that flows between the pendulous masses so as to viscously couple them together. Other details of the method are generally consistent with the functional details of the accelerometer described above.

BRIEF DESCRIPTION OF THE DRAWINGS

FIG. 5 is a graph analogous to FIG. 1, but showing the effect of different coupling coefficients between two proof masses in the present invention.

DESCRIPTION OF THE PREFERRED EMBODIMENT

Figure 1:
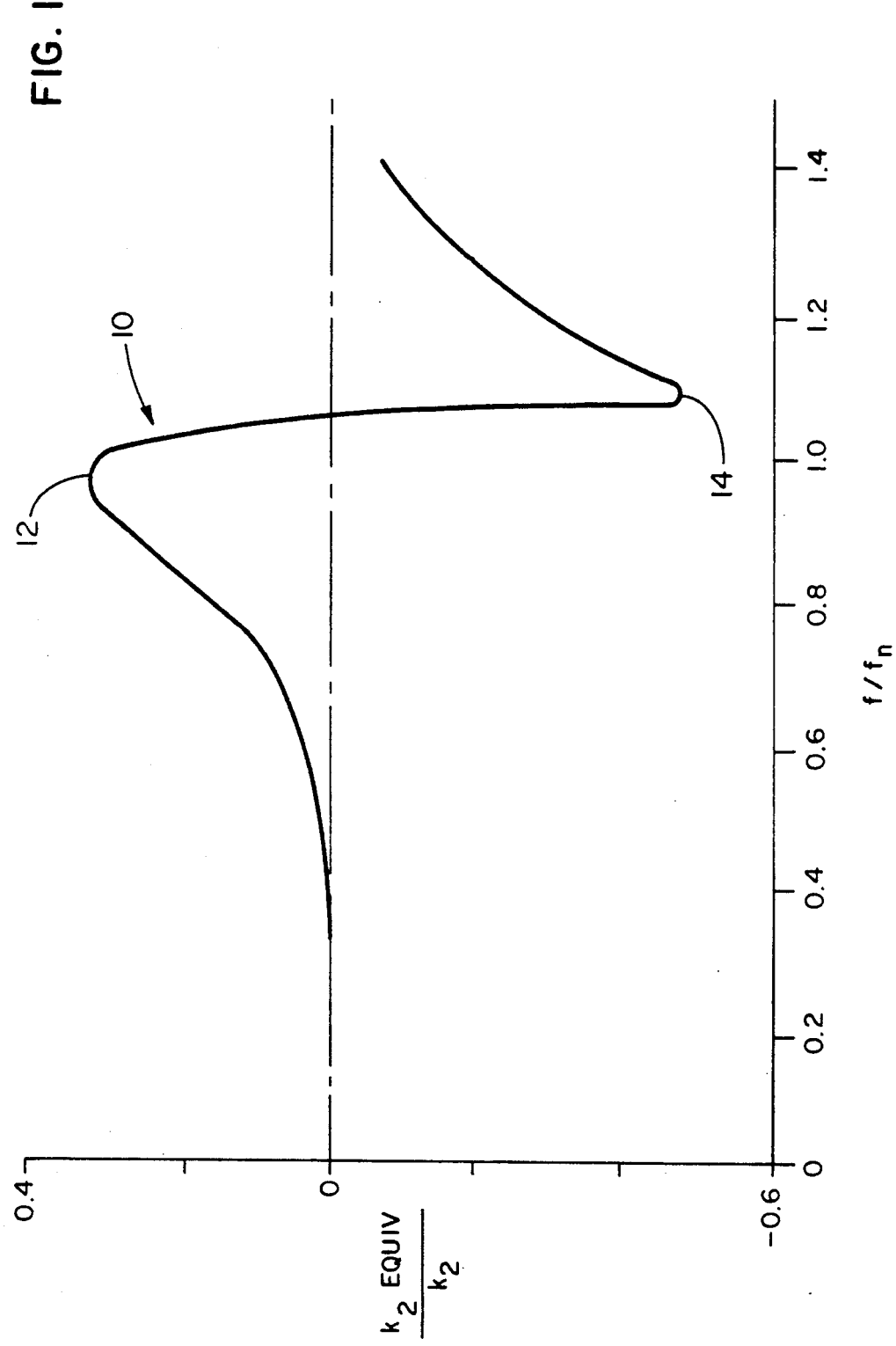
FIG. 1 is a graph showing the relationship between two ratios, the first being the ratio of a dual VBA system nonlinearity and a nonlinearity of one of the quartz crystals comprising the dual VBA, and the second being the ratio of an excitation frequency and the resonant frequency of the proof masses comprising the accelerometer for an assumed mismatch of 1% in the resonant frequencies and 1% in the damping ratios.

As explained in the Background of the Invention, prior art dual VBAs tend to exhibit a significant error due to a tracking mismatch between the two proof masses in the accelerometer that occurs when the accelerometer is excited at frequencies close to the resonant frequency of the proof masses. FIG. 1 graphically illustrates this phenomenon by plotting the ratio of excitation frequency to resonant frequency on the abscissa and, on the ordinate, the ratio of a nonlinearity of the system, $k_2$ equivalent, to a nonlinearity of either of the two crystal resonators, $k_2$. Ideally, the nonlinearity ratio, $k_2$ equivalent/$k_2$, should equal zero, since system nonlinearity should equal zero. However, as is apparent from a plotted curve 10 in this figure, the nonlinearity ratio rises to a maximum value on curve 10 at a reference numeral 12 when the excitation frequency is approximately equal to the resonant frequency of the proof masses; and, as the excitation frequency slightly exceeds the resonant frequency, the nonlinearity ratio drops to a minimum value of the curve at a reference numeral 14. The tracking errors evidenced by the nonlinearity ratio for curve 10 thus contributes significantly to system error under such dynamic conditions. The magnitude of this error may be judged by noting that vibrating beam resonators have an inherent nonlinearity, $k_2$, which is 10-20 times larger than $k_2$ equivalent allowed for tactical systems, and as much as 50 times larger than $k_2$ equivalent allowed for inertial navigation systems.

Figure 2:
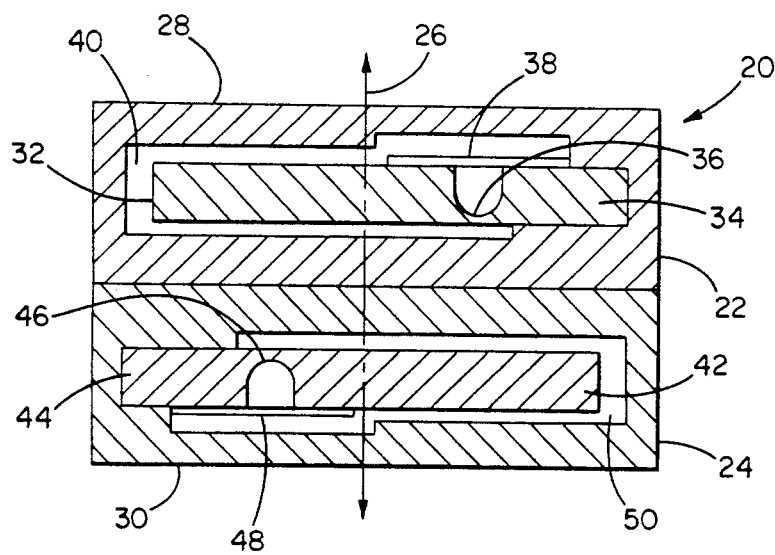
FIG. 2 is a schematic cross-sectional view of a prior art dual VBA in which the proof masses are mounted in separate cavities and are not coupled.

FIG. 2 schematically illustrates a prior art dual VBA, generally at reference numeral 20. Accelerometer 20 includes a first enclosure 22 attached to a second enclosure 24 in a stacked arrangement. An acceleration-sensitive axis 26 extends transversely through a top facing surface 28 and a bottom facing surface 30 of first enclosure 22 and second enclosure 24, respectively. Within first enclosure 22 is disposed a first proof mass 32, which has a longitudinal axis that extends generally transversely to acceleration-sensitive axis 26. First proof mass 32 is integrally connected to a first base 34 by a flexure 36, permitting the first proof mass to pivot up or down along acceleration-sensitive axis 26 as accelerometer 20 is subjected to an acceleration having a component directed along this axis. First base 34 is fixedly mounted within first enclosure 22. A quartz crystal resonator 38 that extends between first base 34 and first proof mass 32 is subjected to stress as a result of first proof mass 32 deflecting due to its inertia under the influence of acceleration directed along acceleration-sensitive axis 26.

As shown in FIG. 2, when an applied acceleration causes first proof mass 32 to deflect vertically upward along acceleration-sensitive axis 26, quartz crystal resonator 38 is subjected to a compression. Conversely, when accelerometer 20 is subjected to an acceleration that causes the first proof mass to deflect vertically downward along the acceleration-sensitive axis, quartz crystal resonator 38 is subjected to tension. The forces of tension or compression applied to quartz crystal resonator 38 thus cause it to produce a corresponding signal indicative of the magnitude and direction of acceleration acting on accelerometer 20 along its acceleration-sensitive axis.

Pivotal movement of first proof mass 32 is partially damped by fluid contained within a cavity 40 defined by first enclosure 22. The spacing between the upper and lower generally planar surfaces of first proof mass 32 and the adjacent internal surfaces of first enclosure 22 is sufficiently small so that a phenomenon known as "squeeze film damping" occurs, which tends to limit free oscillation of the first proof mass within cavity 40. Squeeze film damping results as fluid within cavity 40 is displaced from between adjacent planar surfaces of the first enclosure and first proof mass 32 due to the pivotal movement of the first proof mass. (These planar surfaces of the enclosure are sometimes referred to as "damping plates".) Displacement of the first proof mass produces a localized compression of the fluid between these surfaces as the first proof mass moves closer to the adjacent damping plate, and creates a partial fluid vacuum between the same surfaces as the first proof mass moves in the opposite direction. The rate of fluid flow away from the area of compression and into the area of partial vacuum is sufficiently slow so that compressibility effects are negligibly small and forces exerted by the fluid simply dampen free oscillation of first proof mass 32.

Similarly, second enclosure 24 includes a second proof mass 42, which is integrally connected to a second base 44 by a flexure 46. A quartz crystal resonator 48 extends between second base 44 and second proof mass 42, opposite flexure 46. Quartz crystal resonator 48 is subjected to tension and compression due to pivotal movement of second proof mass 42 about flexure 46 as a result of an applied acceleration and produces signals corresponding to the acceleration directed along acceleration-sensitive axis 26, substantially like quartz crystal resonator 38. However, quartz crystal resonators 38 and 48 are connected in push-pull mode, so that an acceleration causing compression of quartz crystal resonator 38 causes tension in quartz crystal resonator 48, and vice versa. Second proof mass 42 is disposed within a cavity 50 defined by second enclosure 24 and is also subjected to squeeze film damping, which limits its free oscillation, just as explained in respect to first proof mass 32. Due to characteristic differences in flexure 36 and quartz crystal resonator 38, compared to flexure 46 and quartz crystal resonator 48, the tracking error graphically shown in FIG. 1 develops as accelerometer 20 is excited at a frequency close to the natural resonant frequency of first and second proof masses 32 and 42. Since the first and second proof masses are not in any way coupled, they tend to track differently at the resonant frequency, thereby developing the rather significant nonlinearity ratio error discussed above.

Figure 3:
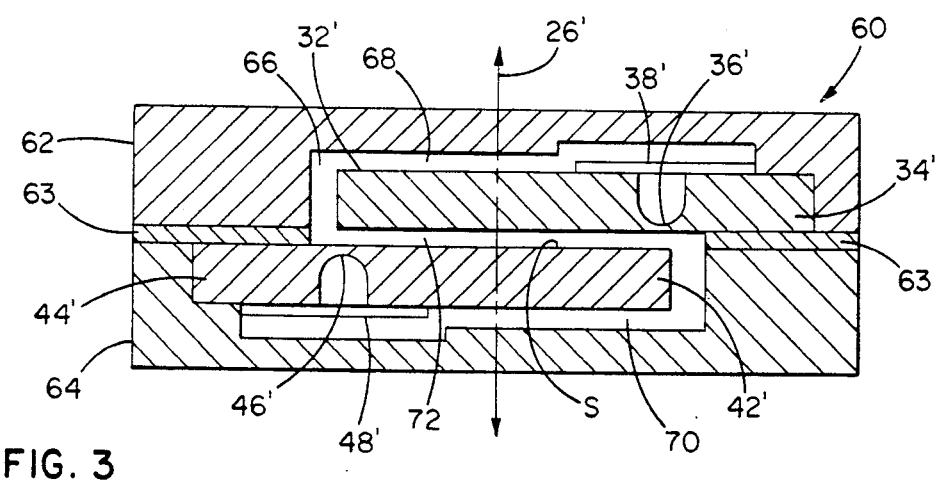
FIG. 3 is a schematic cross-sectional view of a dual VBA in accordance with the present invention.

Turning now to FIG. 3, an accelerometer in accordance with the present invention is shown generally at reference numeral 60. Elements of accelerometer 60 that are substantially similar to corresponding elements in accelerometer 20 are identified with the same reference numeral; however, a prime is added to the reference numerals of similar elements in accelerometer 60 to more clearly differentiate between the prior art accelerometer and the present invention. Accelerometer 60 includes a top enclosure 62 and a bottom enclosure 64, joined with an intermediate spacer 63. Top enclosure 62 and bottom enclosure 64 thus define a cavity 66 in which are disposed a first proof mass 32' and a second proof mass 42'. First proof mass 32' is integrally connected to a first base 34' via a flexure 36', permitting the first proof mass to pivotally deflect along an acceleration-sensitive axis 26', which extends generally transversely to the first proof mass, through accelerometer 60. A quartz crystal resonator 38' is disposed opposite flexure 36', connecting first proof mass 32' to first base 34' so that the quartz crystal resonator is subjected to either tension or compression as proof mass 32' deflects due to the acceleration.

Similarly, a second proof mass 42' is integrally connected to a second base 44' through a flexure 46'. Opposite flexure 46' is disposed a quartz crystal resonator 48'. Quartz crystal resonators 38' and 48' thus produce signals corresponding to the acceleration directed along acceleration-sensitive axis 26' to which accelerometer 60 is subjected.

First and second proof masses 32' and 42' are disposed within cavity 66 defined by top enclosure 62 and bottom enclosure 64. Further, first proof mass 32' is closely separated from second proof mass 42' by a spacing 72 (also identified in the figure by the letter "S"). The two proof masses are viscously coupled by a fluid contained within cavity 66 with a force that varies as $1/S^3$. This fluid may comprise dry air, dry nitrogen gas, dry argon, or dry helium gas, dry helium being preferred because of its higher thermal conductivity compared to any of the other listed gases. The two proof masses are coupled together by the squeeze film damping phenomenon described above. Spacing 72, i.e., S, is preferably about 0.001 inches. Accordingly, first proof mass 32' and second proof mass 42' tend to track each other as they are displaced, any nontracking rotational movement that would vary S and thus produce a tracking error being damped by the squeeze film damping force exerted by the fluid disposed between the two proof masses.

In addition, just as in the prior art accelerometer shown in FIG. 2, proof masses 32' and 42' are subject to squeeze film damping in respect to the adjacent planar surfaces or damping plates comprising the interior surfaces of top enclosure 62 and bottom enclosure 64. The spacing between the top planar surface of first proof mass 32' and the inner surface of top enclosure 62 is identified by reference numeral 68 and is approximately equal to a corresponding spacing 70 between the generally planar surface of second proof mass 42' and the inner planar surface of bottom enclosure 64.

Figure 4:
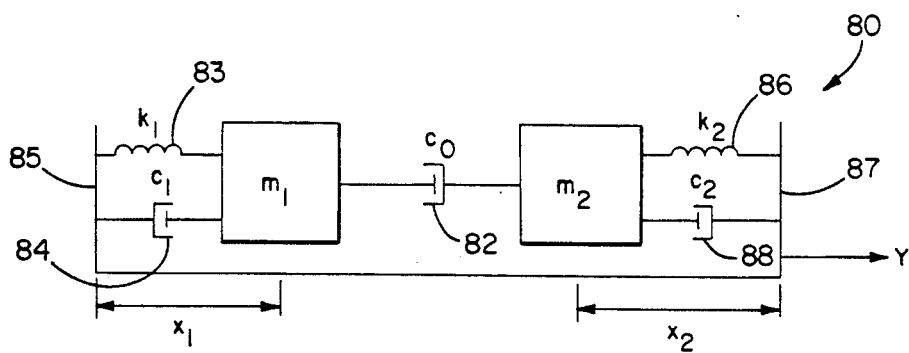
FIG. 4 is a schematic representation of the mechanical system provided by viscously coupling two proof masses as shown in FIG. 3.

Turning now to FIG. 4, a mechanical model 80 illustrates the dynamic relationship between first proof mass 32' and second proof mass 42' in accelerometer 60. In model 80, the elements of accelerometer 60 are generally characterized as masses, dashpots, and springs. However, it is not intended that these portions of model 80 identically correlate to specific elements of accelerometer 60.

In model 80, a first mass, $m_1$, is coupled to a second mass, $m_2$, by a dashpot 82, which corresponds generally to the viscous fluid couple between the first and second proof masses. This dashpot has a damping constant, $c_0$. Mass $m_1$ is also connected to a fixed support 85 by a spring 83, which corresponds generally to the combined elasticity of flexure 36' and quartz crystal resonator 38', and has a spring constant, $k_1$. A dashpot 84 is connected between fixed support 85 and mass $m_1$ and corresponds generally to the squeeze film damping that occurs in space 68. Dashpot 84 has a damping coefficient, $c_1$. Fixed support 85 corresponds generally to top enclosure 62.

Similarly, mass $m_2$ is connected through a spring 86 having a spring constant $k_2$, to a fixed support 87, generally corresponding to bottom enclosure 64. Spring 86 generally represents the combined elasticity of flexure 46' and quartz crystal resonator 48'. A dashpot 88 generally corresponding to the squeeze film damping developed in space 68 has a damping coefficient $c_2$ and is also connected to fixed support 87.

The vibrational displacement of mass $m_1$ is represented by $x_1$, and the vibrational displacement of mass $m_2$ is represented by $x_2$. The equations of motion for the masses of model 80 in respect to a y axis, as shown in FIG. 4, are as follows:

$$m_1(\ddot{y}-\ddot{x}_1)+c_1\dot{x}_1+k_1x_1-c_0(\dot{x}_1-\dot{x}_2)=0 \quad (1)$$

$$m_2(\ddot{y}-\ddot{x}_2)+c_2\dot{x}_2+k_2x_2-c_0(\dot{x}_2-\dot{x}_1)=0 \quad (2)$$

By applying Laplace transforms to Equations (1) and (2), and estimating certain parameters for the motion of first proof mass 32' and second proof mass 42' with natural frequencies assumed to be mismatched by 1%, it is possible to determine the nonlinearity ratio as a function of frequency ratio for different values of the damping coefficient $c_0$, producing the graphical representation shown in FIG. 5. If the damping coefficient $c_0$ is equal to zero, i.e., if there is no coupling between the two masses, then a curve 90 results, which represents much the same tracking error as observed in prior art accelerometer 20. However, if the first and second proof masses in accelerometer 60 are closely spaced apart so that they are viscously coupled and mutually dampen out-of-phase oscillation, a different, much improved result is obtained.

A curve 92 in FIG. 5 illustrates the case where the mutual damping coefficient $c_0$ equals $(c_1+c_2)/2$, i.e., where the mutual damping coefficient $c_0$ is substantially equal to the average of $c_1$ and $c_2$. Even better coupling is obtained if the mutual damping coefficient $c_0$ equals the sum of $c_1$ and $c_2$, as shown by a curve 94. Preferably, accelerometer 60 is constructed so that spacer 63 provides the distance S that produces a damping coefficient $c_0$ having a desired relationship to the damping coefficients $c_1$ and $c_2$, i.e., so that the error due to mistracking lies between curves 92 and 94 in FIG. 5. Generally, this condition is achieved if S is less than the sum of spacings 68 and 70. In this case, the error is generally much less than the allowance for a tactical grade system at all frequencies, and may approach the limit for inertial grade only in a narrow frequency band.

The spacings 68 and 70 between first proof mass 32' and top enclosure 62, and between second proof mass 42' and bottom enclosure 64, respectively, are each limited by the requirement to accommodate the deflection of the proof masses in response to a given maximum acceleration. Similarly, spacing 72, although less than spacings 68 and 70, is limited by the required range of pivotal movement of first and second proof masses 32' and 42' about flexures 36' and 46', respectively. By viscously coupling the first and second proff masses together, a substantial improvement is achieved in the dynamic tracking of accelerometer 60 compared to that of accelerometer 20, if subjected to vibration at frequencies approaching the natural resonant frequency of the proof masses.

This disclosure has concentrated on the effects of mistracking at frequencies near the pendulum resonant frequency causing partial failure of common mode rejection of the inherent non-linearity of vibrating beam force-sensitive resonators. It is well known that there is an additional linear error in pendulous accelerometers (known as cross-coupling error) caused by the angular deflection of a pendulum under an applied acceleration. When two pendulums 32 and 42 are mounted as shown in FIG. 2, with their flexures 36 and 46 at opposite ends of the case, this cross-coupling error cancels as a common mode error—if the pendulums track dynamically. When mistracking occurs, the cross-coupling error does not cancel. However, viscous coupling of first proof mass 32' and second proof mass 42' in accelerometer 60 minimizes or eliminates mistracking, thereby effectively eliminating cross-tracking error.

While the present invention has been disclosed in respect to a preferred embodiment, those of ordinary skill in the art will appreciate that further modifications thereto may be made within the scope of the claims that follow below. Accordingly, it is not intended that the disclosure in any way limit the scope of the claims.

The embodiments of the invention in which an exclusive property or privilege is claimed are defined as follows:

1. An accelerometer comprising:
    a. an enclosure including a first and a second damping plate disposed at generally opposite ends of the accelerometer, said enclosure defining a cavity between the first and second damping plates;
    b. a first pendulous mass integrally connected to a first fixed base by a first flexure, said first pendulous mass being pivotable about said first flexure in response to an acceleration;
    c. a second pendulous mass integrally connected to a second fixed base by a second flexure, said second pendulous mass being generally in parallel alignment with and closely spaced apart from said first pendulous mass, and being pivotable about said second flexure in response to the acceleration;
    d. a first sensor connected between said first fixed base and said first pendulous mass so as to sense rotational movement of the first pendulous mass due to the acceleration and to produce a first signal in response thereto;
    e. a second sensor connected between said second fixed base and said second pendulous mass so as to sense rotational movement of the second pendulous mass due to the acceleration and to produce a second signal in response thereto; and
    f. a fluid disposed within the cavity, between said first and second pendulous masses, wherein said first and second pendulous masses are spaced sufficiently close to each other so that the fluid interposed between them defines a coupling force and damps out a resonant oscillation tracking error of said first and second pendulous masses when they are subjected to vibrations at their resonant frequency, thereby minimizing a common mode rejection error in the first and the second signals caused by resonant oscillation of the first and second pendulous masses.

2. The apparatus of claim 1, wherein the first and the second pendulous masses have generally opposed planar surfaces that are spaced sufficiently close to each other so that the fluid between the first and the second pendulous masses provides a squeeze film damping of out of phase pivotal motion that would cause a tracking error.

3. The apparatus of claim 1, wherein the first damping plate defines a generally planar surface that is disposed opposite and closely proximate a generally planar surface of the first pendulous mass, and wherein the fluid is disposed between these generally planar surfaces so that it provides a squeeze film damping of the pivotal motion of the first pendulous mass.

4. The apparatus of claim 1, wherein the second damping plate defines a generally planar surface that is disposed opposite and closely proximate a generally planar surface of the second pendulous mass, and wherein the fluid is disposed between these generally planar surfaces so that it provides a squeeze film damping of the pivotal motion of the second pendulous mass.

5. The apparatus of claim 1, wherein the space between the first and the second pendulous masses is the same or less than the sum of the space between the first pendulous mass and the first damping plate, and the space between the second pendulous mass and the second damping plate.

6. The apparatus of claim 1, wherein the fluid comprises a gas.

7. The apparatus of claim 1, wherein said coupling force approximately varies as $1/S^3$, where S is the spacing between the first and the second pendulous masses.

8. The apparatus of claim 1, wherein the first and the second fixed bases are clamped between the first and second damping plates at opposite sides of the cavity.

9. A viscously coupled accelerometer comprising:
    a. an enclosure defining an elongate cavity filled with a fluid;
    b. first acceleration sensing means having a resonant frequency, mounted within the cavity, for producing a first signal in response to an acceleration; and
    c. second acceleration sensing means having a resonant frequency, mounted within the cavity closely adjacent the first acceleration sensing means, for producing a second signal in response to the acceleration, said second acceleration sensing means being coupled to said first acceleration sensing means by the fluid within the cavity defining a coupling force so as to damp out-of-phase resonant oscillation of the first and the second acceleration sensing means, thereby minimizing common mode rejection errors in the first and second signals when the first and the second acceleration sensing means are subjected to vibrations at their resonant frequency.

10. The accelerometer of claim 9, wherein the first and second accelerator sensing means each include a separate integral beam having a pivotal pendulum portion and a fixed portion, said pendulum portion being connected to the fixed portion by a flexure, and a stress sensor disposed opposite the flexure that connects the pendulum portion to the fixed portion, each of said pendulum portions pivoting about its flexure and thus applying stress to the stress sensor in response to the acceleration.

11. The accelerometer of claim 10, wherein the pendulum portions of the first and second acceleration sensing means have generally planar surfaces, and wherein the fixed portions are mounted within the enclosure so that each pendulum portion is closely proximate a generally planar surface of the enclosure, said fluid in the cavity being disposed between the pendulum portions and the planar surfaces of the enclosure damping oscillations of the pendulum portions.

12. The accelerometer of claim 11, wherein the generally planar surfaces of the enclosure that are proximate the pendulum portions of the first and second acceleration sensing means are disposed at opposite ends of the cavity and are generally parallel to each other.

13. The accelerometer of claim 11, wherein the space between the pendulum portions of the first and the second acceleration sensing means is the same order of magnitude as the total of the respective spacings between each pendulum portion and its closely proximate generally planar surface of the enclosure.

14. The accelerometer of claim 10, wherein said coupling force between the pendulum portions varies as $1/S^3$, where S is the spacing between the pendulum portions of the first and second accelerations sensing means.

15. The accelerometer of claim 9, wherein the fluid comprises a gas.

16. A method for damping tracking error resonant oscillations in an accelerometer having dual pendulous masses that are each connected to a sensor producing a signal corresponding to an acceleration that displaces the pendulous mass, comprising the steps of:
   pivotally mounting the pendulous masses within a common cavity sufficient close to each other to enable a fluid interposed between them to damp out said tracking error resonant oscillations; and
   filling the cavity with a fluid disposed between the pendulous masses, thereby viscously coupling them together and defining a coupling force.

17. The method of claim 16, further comprising the steps of mounting the pendulous masses within the cavity closely adjacent to a planar surface of an enclosure defining the cavity so that there is fluid between each of the pendulous masses and one of the planar surfaces, whereby the fluid provides a squeeze film damping of the pendulous masses.

18. The method of claim 16, wherein the step of mounting the pendulous masses comprises the step of clamping a fixed portion of each pendulous mass between sections of an enclosure that define the cavity, a pivotal portion of each pendulous mass being connected to the fixed portion by a flexure.

19. The method of claim 16, further including the steps of disposing flexures on opposite sides of the cavity and disposing said pendulous masses such that each pendulous mass pivots about a flexure.

20. The method of claim 16, wherein said coupling force varies approximately as $1/S^3$, where S is the spacing between the pendulous masses.

* * * * *